Sept. 2, 1924.                                                    1,507,333
                              J. B. CARROLL
                     MAGNETIC TOY OR SIMILAR DEVICE.
                          Filed Oct. 11, 1923
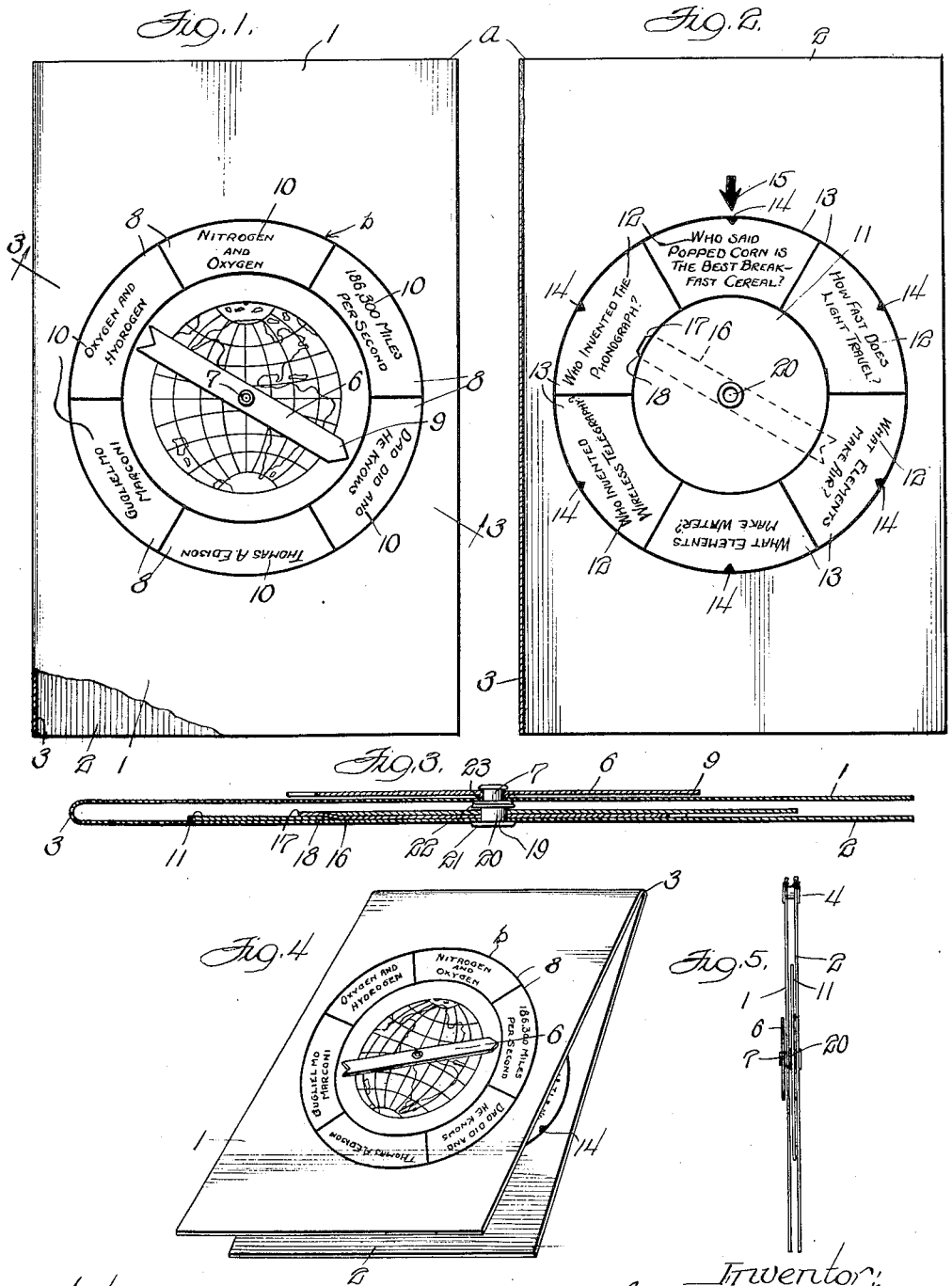

Patented Sept. 2, 1924.

1,507,333

UNITED STATES PATENT OFFICE.

JOHN B. CARROLL, OF OAK PARK, ILLINOIS, ASSIGNOR TO J. B. CARROLL COMPANY, OF CHICAGO, ILLINOIS, A CORPORATION OF ILLINOIS.

MAGNETIC TOY OR SIMILAR DEVICE.

Application filed October 11, 1923. Serial No. 667,884.

*To all whom it may concern:*

Be it known that I, JOHN B. CARROLL, a citizen of the United States, residing in Oak Park, in the county of Cook and State of Illinois, have invented certain new and useful Improvements in Magnetic Toys or Similar Devices, of which the following is a specification.

This invention relates to that class of magnetic toys or similar devices having a movable indicator which is formed of magnetizable material or adapted to be magnetically actuated, or influenced or moved with respect to a series or any desired number of suitable disposed distinctive spaces, or marks, characters, inscriptions, words, signs, symbols or things printed or otherwise formed and arranged in proximity or proximate relation to the indicator.

The principal object of this invention is to provide a simple and economical, new and useful magnetic, magnetizable or magnetically controlled or actuated toy or similar device.

A further object of the invention is to provide an improved, simple, economical and efficient magnetic or magnetically actuated toy or game which is entertaining or interesting and instructive or adapted to be used for amusement or for advertising or other purposes.

Other and further objects of the invention will appear from the following description and claims, and from an inspection of the accompanying drawings, which are made a part hereof.

The invention consists in the features, combinations, details of construction and arrangement of parts herein described and claimed.

In the accompanying drawings:—

Figure 1 is a plan view of a magnetic toy or device constructed in accordance with my invention and adapted to be conveniently placed in an envelope or container and mailed or used for advertising or other purposes; and shows a magnetic or magnetically actuated indicator pivotally mounted on a front leaf or page of a foldable sheet of cardboard or similar material having a series of spaces and a series of marks, characters, signs, words or designations printed, inscribed or otherwise produced and arranged in proximity to said indicator;

Fig. 2 is a plan view of another leaf or page of sheet material which in this instance is formed in one integral piece with and connected in foldable relation to the front page or leaf shown in Fig. 1, the foldable or connected margins of said pages or connected sheets being shown in whole or in part in section; and a pivoted, rotative or adjustable circular marked, inscribed or printed card or sheet member having a magnetic or magnetizable member or metallic bar fixed thereto and rotative therewith upon an axis which is movable or adjustable with respect to the axis of the pivoted indicator shown in Fig. 1, is shown mounted on the leaf, page or sheet illustrated in said Fig. 2;

Fig. 3 is a view in transverse section taken on line 3—3 of Fig. 1, looking in the direction indicated by the arrows;

Fig. 4 is a perspective view of a modification of my invention, showing the top or short upper margins of the front and back leaves or pages of sheet material flexibly or foldably connected; and Fig. 5 is another modification showing two sheets pivotally connected.

In constructing an improved magnetic or magnetically actuated toy or device in accordance with my invention, I provide a supporting member *a*, formed of suitable sheet material, such, for example, as cardboard or paper of suitable weight and strength.

In the form of the device shown in Figs. 1 to 3 inclusive, the supporting member comprises a front leaf, page or top sheet portion 1, and a back, inner or bottom leaf, page or sheet portion 2, both of which are, by preference, formed in one integral piece of sheet material, such, for example, as cardboard, and connected in hinged or foldable relation to each other by suitable means, such, for example, as an integral flexible foldable marginal hinge or sheet portion 3. (See Figs. 1, 2, and 3.)

It is obvious, however, that the top and bottom or front and back leaves, pages or sheets 1 and 2 may be formed of separate pieces of sheet material or separate cards or sheets and flexibly connected or secured in relatively movable or hinged relation to each other by any desired ordinary and well known or suitable flexible, foldable or hinged connecting means, such, for example, as a pivot or eyelet or rivet 4, or other suitable connecting means. (See Fig. 5.)

Rotatively mounted on the front page sheet or leaf 1, or supporting sheet *a*, is a freely movable pivoted or rotative indicator 6, which is formed by preference of magnetic, magnetized, or magnetizable material, such as a thin strip or bar of sheet steel or other suitable magnetizable material, and supported upon a suitable pivot or axle 7 mounted on and projecting upward or outward from the normally flat outer or upper surface of the top leaf, sheet or page 1 and through the longitudinal central portion of the indicator 6. The supporting pivot or axle 7 is, by preference, located at or near the center of the top or front page or leaf 1 of the foldable or hinged supporting member or sheet *a*, and in perpendicular relation to the normally flat front or outer face of said page or sheet, and forms a central axle or axial support for the indicator 6 which is adapted to permit the latter to rotate freely upon its axis.

Supported upon the leaf or page or sheet upon which the indicator 6 is pivotally supported, and, by preference, printed, inscribed, impressed or otherwise produced upon the face of said sheet or page 1 in close proximity or proximate relation to and in position to surround or encircle the indicator 6, and in concentric relation to the axis of said indicator, is a series of distinctive or marked spaces 8 each containing or adapted to contain one or more marks, characters, inscriptions, words, signs, symbols or things printed or otherwise produced, or formed and arranged in proximity and suitable predetermined relation to each other, and at suitable intervals around or circumferentially of the axis of the indicator 6, and the circular path of movement of the said indicator, and particularly the pointed end or indicator finger 9 of said indicator.

For example: In each of the spaces 8 is provided one or more distinctive marks, characters, inscriptions, words, signs, symbols or thing printed or otherwise produced and disposed in close proximity to the pivoted indicator 6, and adapted to represent, indicate, mark, designate or constitute a response or answer to a question, or other thing to be indicated or pointed out by the indicator 6.

A dial *b* is thus formed, preferably by printing a suitable circular outline or figure on leaf 1 and having symmetrical segmental divisions or spaces 8 each containing a desired arrangement of words or characters.

Supported upon and in rotative, adjustable or movable relation to the sheet, leaf or page 2, which is in hinged, foldable or movable relation to the indicator-supporting sheet or part 1, is a pivoted, adjustable or rotative disk, card or sheet member 11, which has on its face a series of distinctive marks, characters, inscriptions, words, signs, symbols or things 12—for example, a series of printed questions disposed at predetermined intervals circumferentially or around the axis or center of the disk in a series of distinctive spaces 13, each provided with a peripheral graduation mark 14 on the disk or marked rotative card member 11, and movable with the latter to different adjusted positions with respect to an index mark 15 on the supporting member 2. Each question or mark 12 corresponds with an answer or mark 10, on the indicator-supporting leaf, or dial on sheet *a*, and is intended and adapted to be moved to and supported in position adjacent to the index mark 15 whenever such corresponding answer or mark 10 is to be indicated or pointed out or distinguished from other answers, marks or things 10 in the spaces 8. And each space 13 and graduation mark 14 corresponds with a predetermined space 8 and its inscription, answer, marks or characters 10, on the dial *b*.

A magnetized or magnetizable bar member or magnet 16 is fixed to and rotative or otherwise movable with the disk, or movable marked question sheet or card 11, and preferably extends across the axial center and on the inner or invisible side of the same.

The magnet or magnetizable bar 16 thus fixed to the disk 11 is, by preference hidden from view, or covered entirely, or, for convenience in construction, with only a small end portion 17 extending through a slit 18 in one or more layers of the cardboard disk, thus affording a simple, inexpensive and convenient means for connecting the disk and magnet or magnetizable bar.

The magnetic bar 16 is provided with a central recess or opening 19 for engaging a supporting pivot pin or axle 20, which may be in the form of an eyelet or rivet, having annular end flanges 21, 22, for holding the axle or rivet 20 in position upon its support 2, and for holding the magnetic bar 16 and the rotative marked question card or sheet in operative position and in freely rotative relation to the supporting sheet or leaf 2 and the fixed index mark 15.

By indenting or depressing the perforated central portion of the indicator 6, so as to form a central downwardly projecting boss or hub 23 surrounding the axle or pivot 7 which has annular end flanges 24 adapted to hold the indicator in freely rotative relation to the dial *b* and its marked spaces or graduations 8, the bearing thus afforded is found in practice to be sufficiently sensitive or free from unnecessary friction to permit the magnetic or magnetically actuated indicator to be turned by the action of magnetic force into parallel relation to the bar magnet 16 whenever the dial $b$ and question card or disk 11 are laid one upon the other or in superposed relation, even with the dial $b$ and the leaf or page 1 between the indicator 6 and the bar magnet or magnetizable bar member 16.

The indicator 6 and bar 16 are both, by preference, formed of thin sheet metal, such as tempered sheet steel, and magnetized. And although the device will operate with but one of said elements magnetized or charged so as to be a permanent magnet, I prefer to magnetize both of said elements. And this may be accomplished in any ordinary and well known manner, for example, by causing a magnetic current or electric current to pass through both of said metallic elements 6 and 16 while they are held in close proximity to each other and parallel, thus magnetizing them both simultaneously; of they may be magnetized separately and independently of each other, as desired.

The indicator 6 and magnetic bar 16, are so mounted, by preference upon connected pages, leaves or pieces of cardboard or similar sheet material, such for example as pages or leaves 1 and 2 having hinged or flexibly connected margins, that when the part 1 with its dial and indicator are laid or folded over or in superposed relation to the leaf 2 and disk 11, as indicated in Fig. 1, the magnetic indicator 6 and magnetic bar 16 will be brought into parallel relation to each other by the action of magnetic force, with the indicator pointing out or indicating a distinctive mark, space, division or graduation, or a combination of words or characters on the dial $b$ which corresponds with or answers a question, mark or expression shown on the disk 11 in proximity to or in position to be indicated or identified by the index mark 15 on leaf or support 2 and near the margin of the rotative or adjustable question disk or card 11. And when the leaves 1 and 2, or flexibly connected or hinged supports are spread apart the axes of the indicator 6 and magnetic bar 16 will be separated and said indicator and magnetic bar so far apart that neither will be actuated by the other or by any magnetic current passing through the separated magnetic elements.

When the leaves or pages 1 and 2 are thus separated, it is only necessary to adjust the rotative or adjustable question disk card, or pivoted member 11 to a predetermined position with respect to the index mark 15, for example, as shown in Fig. 2, and then fold or lay the page 1 with its dial $b$ upon or in superposed relation to the page 2 and disk 11, with the axles of the disk and dial and rotative indicator 6 in end to end or concentric relation, thereby bringing the magnetized indicator 6 and bar 16 into such proximity and relation to each other that the indicator will be automatically turned on its axis by the action of magnetic force into a position parallel to the bar 16, in whatsoever position the latter may be.

The graduations or distinctive spaces on the disk 11 and dial $b$ are, by preference, symmetrical, so that a question or distinctive space for any given question, mark or character on the question disk will correspond with or occupy a space within an arc of a circle on said disk, and the distinctive space in which an answer to such question is located on the dial $b$ will occupy a corresponding arc or segment of a circle on the dial $b$. But I prefer that the magnetic bar 16 be so disposed with respect to the marks or questions on the question disk that the indicator will not point in the direction of or to the question when it is in position to point out the answer to such question. In other words, I prefer that the question and its answer should not be superposed or located one directly over the other when the question disk and the dial are in superposed relation or laid together and with the indicator pointing to the required space, distinctive mark answer or character on the dial. It is obvious in view of the foregoing description, that the dial $b$ and question disk 11 may be mounted on either side of the supporting sheet, or on separate sheets or cards, although I prefer to have them mounted on sheets or cards which are hinged together or flexibly connected at or near their margins, so that they will not become detached from each other or disarranged.

My improved magnetic or magnetically actuated toy or device, when constructed in accordance with my invention as above described, is well adapted for use as an advertising medium, and is provided with a space or spaces adapted to contain advertising matter printed or otherwise produced thereon. It is also well adapted for use as a toy, and for entertainment and instruction, and for other purposes which will be readily understood by those skilled in the art.

And it will be readily seen that the device when so constructed is light and compact, and of convenient size and shape and in every way suitable for enclosing and mailing in an envelope singly or otherwise, and for handling and shipment in quantities, or as desired.

The words "magnetic" and "magnetizable" respectively are each used in their broadest sense and meaning: And each of these words "magnetic" and "magnetizable" respectively as used in this specification and claims means and includes within its scope and meaning any thing or substance which is in whole or in part capable of being acted upon, actuated, controlled, attracted or repelled or otherwise influenced by magnetic force or by the forces of attraction and repulsion exercised by a magnet, or of exercising magnetic force, or having the qualities of a magnet or magnetic body or substance either temporarily or permanently.

I claim:

1. In a device of the class described, the combination of a dial, a magnetic indicator rotatively supported on and in movable relation to said dial, a rotative nonmetallic sheet supported in movable relation to said dial, said dial and rotative sheet having spaces thereon adapted to contain correlated print, and a second magnetic member attached to and movable with said rotative non-metallic sheet to different positions with respect to said dial.

2. In a device of the class described, the combination of a dial, a magnetized indicator member rotatively supported on and in movable relation to said dial, a rotative non-metallic disk supported in movable relation to said dial, said dial and disk having correlated printed matter thereon, and a second magnetic member attached to and movable with said non-metallic disk and adapted to extend in parallel relation to said rotative magnetized indicator member when said dial and disk are in superposed relation to each other.

3. In a device of the class described, the combination of a dial, a magnetized indicator member rotatively supported on and in movable relation to said dial, a rotative graduated disk supported in movable relation to said dial, said dial and disk having spaces thereon adapted to contain correlated printed matter, and a second magnetic member attached to and rotatable with said disk and movable into and out of concentric relation to said dial and said rotative indicator member.

4. In a device of the class described, the combination of a dial, a flexible, foldable supporting sheet upon which said dial is located, a magnetized indicator rotatively supported on and in rotative relation to said supporting sheet and to said dial, a rotative non-metallic sheet supported upon said first-mentioned supporting sheet, and a second magnetizable member attached to and rotative with said rotative non-metallic sheet and adapted to extend in substantially concentric relation to said magnetized indicator member when said magnetic members are laid in superposed relation to each other.

5. In a device of the class described, the combination of a plurality of flexibly connected supporting leaves, a dial located on one of said leaves, a magnetic indicator rotatively mounted on said supporting leaf and in movable relation to said dial, a rotative disk supported upon another one of said connected supporting leaves, said dial and disk having correlated printed matter thereon, and a second magnetic member attached to and rotative with said disk and adapted to extend in substantially parallel relation to said rotative magnetic indicator when said flexibly connected leaves are in superposed relation to each other.

6. In a device of the class described, the combination of a plurality of flexibly connected supporting leaves, a dial located on or formed by one of said leaves, a magnetic indicator pivotally mounted on said last-mentioned leaf and in movable relation to said dial, a rotative non-metallic leaf supported upon another one of said flexibly connected supporting leaves, said dial and rotative leaf having spaces thereon adapted to contain correlated printed matter, and a second magnetic member attached to and rotative with said rotative non-metallic leaf, and having its axis movable into and out of concentric relation to the axis of said magnetic indicator.

7. In a device of the class described, the combination of a plurality of supporting leaves having hinged connection with each other, a dial located on one of said leaves, a magnetic indicator pivotally mounted in movable relation to said dial, a rotative non-metallic disk mounted on another one of said connected leaves and in movable relation to said dial, an index on said last-mentioned leaf and adjacent to the peripheral margin of said rotative disk, and a second magnetic member attached to and rotative with said non-metallic rotative disk.

8. In a device of the class described, the combination of a flexible, foldable supporting sheet provided with a series of inscriptions thereon, a magnetized indicator member pivotally mounted in rotative relation to said supporting sheet and said series of inscriptions, a rotative non-metallic sheet mounted upon said supporting sheet in movable relation to said inscriptions and provided with a series of inscriptions on said rotative non-metallic sheet, and a second magnetized member attached to and rotative with said non-metallic rotative sheet.

9. In a device of the class described, the combination of a flexible, foldable supporting sheet having a series of inscriptions thereon, a magnetized indicator member pivotally mounted on said supporting sheet and in rotative relation to said sheet and said inscriptions, a rotative non-metallic disk mounted on said supporting sheet in movable relation to said inscriptions and provided with a series of inscriptions spaced apart on said rotative non-metallic disk, and a second magnetized member attached to and rotative with said non-metallic rotative disk and movable with the latter toward and from said magnetized pivoted indicator member.

10. In a device of the class described, the combination of a flexible, foldable supporting sheet comprising a plurality of flexibly connected leaves, one of said leaves having a series of legends thereon, such, for example, as representations of answers to questions, a magnetized indicator member pivotally mounted on said supporting leaf and in rotative relation to said legends, a rotative non-metallic disk mounted on another one of said flexibly connected leaves and having a series of inscriptions on said rotative non-metallic disk, such, for example, as a series of questions relating to and corresponding with said answers, and a second magnetized member attached to said rotative disk and movable with the same with respect to said magnetized pivoted indicator.

11. In a device of the class described, the combination of a plurality of flexibly connected leaves of sheet material, a dial located on one of said leaves and having printed matter on said dial, such, for example, as a series of answers to questions, a magnetized indicator pivotally mounted on said supporting leaf and in rotative relation to said dial, a rotative non-metallic disk mounted on another one of said flexibly connected leaves and having printed matter in distinctive spaces on said disk, such, for example, as a series of questions to which said answers are related, and a second magnetized member attached to said rotative disk and movable with the same with respect to said dial and magnetized pivoted indicator.

Signed at Chicago, in the county of Cook and State of Illinois, this 5th day of October, 1923.

JOHN B. CARROLL.

Witnesses:
HARRY I. CROMER,
JACOB L. BIEDER.